No. 754,647. Patented March 15, 1904.

UNITED STATES PATENT OFFICE.

WILLIS EUGENE EVERETTE, OF TACOMA, WASHINGTON.

PROCESS OF MAKING CYANIDS AND NITRATES.

SPECIFICATION forming part of Letters Patent No. 754,647, dated March 15, 1904.

Application filed December 28, 1903. Serial No. 186,880. (No specimens.)

*To all whom it may concern:*

Be it known that I, WILLIS EUGENE EVERETTE, a citizen of the United States, and a resident of Tacoma, in the county of Pierce and State of Washington, have invented certain new and useful Improvements in the Art of Manufacturing Cyanids and Nitrates, of which the following is a specification.

The object of my invention is to simplify and cheapen the manufacture of cyanids and nitrates and other compounds containing nitrogen—such as hydrocyanic acid, nitric and other acids, ammonia, &c.—by providing a rapid, simple, and comparatively inexpensive method of forcing the nitrogen of the air into combination with carbon and with various alkalies or other chemical compounds or elements. In accomplishing this object I utilize the fact that when the elements of a chemical compound are forcibly torn apart and allowed to seek other affinities they instantly combine to form new compounds, an element which has a greater affinity for another element thus displacing one with a lesser affinity for the same element. To bring about this violent disruption, I reduce the materials to be disrupted either to an intensely cold or crymic condition and then suddenly subject them to the action of intense heat, or I reduce them to an extreme thermic condition and then subject them suddenly to the action of intense cold.

For practical purposes it is easier to produce the crymic condition first, as the substances to be treated can without difficulty be retained in that condition and readily handled until subjected to the intense heat, while in the reverse process the heated substances are much more difficult to handle, owing to volatilization and other results of intense heat. I have discovered a very simple, cheap, and effective method of producing this disruptive condition for the purpose of combining desired elements with the ordinary atmospheric nitrogen, and thereby producing cyanids of potash, soda, and other alkalies, hydrocyanic, nitric, and other acids, ammonia, nitrates of soda, potash, and other nitrates, and nitrogenous derivates.

As a specific example of my new process I first make an intimate mechanical mixture of any desired quantity of pulverized carbon in any convenient form, such as coal-dust, graphite, or in the form of a carbid or otherwise, and pulverized bicarbonate of sodium, or some other chemical compound or element, and cause this mixture to be blown, by means of compressed air, as a spray of fine dust through a descending jet of liquid air. The pressure of the dust-jet will be sufficient to carry the dust through the liquid air, which escaping under normal conditions is practically without pressure, while the intense cold of the liquid air, about minus 240° Fahrenheit, instantly reduces the temperature of the dust from, say, 60° to minus 180° Fahrenheit. Immediately or as immediately as physically practicable this intensely cold dust on emerging from the liquid-air jet is caused to impinge upon some substance maintained in a state of permanent incandescence—such, for instance, as an arc-light. As a result of this sudden meeting of these intense crymic and thermic conditions, a violent explosion takes place, tearing apart the atoms of the substances contained in the dust-jet, and these atoms instantly form new combinations, which, carried by their own explosive force into a suitable precipitating and condensing chamber as fast as formed, fall and collect as a powder. Upon examination the precipitate will be found to consist largely of a cyanid of the pulverized substance originally mixed with the pulverized carbon and of various nitrate salts. The gases formed would under these conditions either escape or have to be collected by other means afterward and condensed. To preserve, therefore, substantially all the products of explosion, I prefer to employ a jet of hot steam in connection with the condensing-chamber, so that instead of obtaining the cyanids and nitrates as dry products they assume an aqueous steamy condition as fast as formed and gradually cool and condense into a liquid, which is to be pumped out and evaporated to pasty dryness, saving the nitric acid thus formed and then purifying the remaining salts by the ordinary methods of refining chemicals for commercial use.

As valuable by-products of this process there may be recovered hydrocyanic acid or prussic acid, nitrous oxid, nitric acid, and ammonia in addition to the other cyanids and nitrates, the production of which was the main purpose of the process. It is evident that in this way substantially all of the free nitrogen of the air surrounding and filling the space in which the union between the crymic and thermic conditions takes place will seek and secure combination with the carbon, alkali, hydrogen, and other elements or compounds for which it has affinity, leaving probably a slight excess of oxygen uncombined and oxidized as ozone.

As all the ingredients employed are easily obtained and the process does not require any elaborate and expensive apparatus, it will be seen that the occlusion of atmospheric nitrogen thereby brought about results in the economical formation of cyanids and nitrates of whatever material (potassium, sodium, or other substance) was originally used in a pulverized state and that the process is attended with the production of several valuable by-products.

It is obvious that if hydrocyanic acid alone is desired without any by-products it is unnecessary to mix anything with the pulverized carbon inasmuch as the compressed air in which it is held in suspension in the jet will supply all the nitrogen needed to combine with the carbon. It will also at once be obvious to every chemist that the basic feature of this process—namely, the production of a disruptive action by reducing a substance to an intensely cold state and then suddenly subjecting it to intense heat—may be applied with advantage to other substances than carbon and that therefore other products than those specifically mentioned can be obtained; but in this present application I confine myself to the production of cyanids, nitrates, and the other derivates of nitrogen.

I claim—

A process of forming cyanids and nitrates which consists first in reducing a mixture of pulverized material containing carbon to an intense crymic condition by contact with liquid air; second, subjecting said mixture while still in said intense crymic condition to contact with intense heat in the form of incandescence thereby producing a violent disruption of the elements contained in said mixture, and third, collecting the cyanids, acids, ammonia, nitrates and other nitrogenous derivates formed by the union of the nitrogen of the air with the disrupted elements separated by said explosion and preparing them for commercial use.

WILLIS EUGENE EVERETTE.

Witnesses:
ANNA H. VAN HORENBERG,
W. P. PREBLE, Jr.